United States Patent [19]

Bahl et al.

[11] Patent Number: 6,058,205

[45] Date of Patent: *May 2, 2000

[54] SYSTEM AND METHOD FOR PARTITIONING THE FEATURE SPACE OF A CLASSIFIER IN A PATTERN CLASSIFICATION SYSTEM

[75] Inventors: Lalit Rai Bahl, Amawalk, N.Y.; Peter Vincent deSouza, San Jose, Calif.; David Nahamoo, White Plains; Mukund Padmanabhan, Ossining, both of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/781,574

[22] Filed: Jan. 9, 1997

[51] Int. Cl.[7] ............................... G06K 9/62; G06F 17/20
[52] U.S. Cl. .......................... 382/159; 382/225; 706/20; 704/231
[58] Field of Search ........................ 382/159, 225, 382/156, 228, 157, 160, 227; 706/20, 25; 704/254, 231, 232, 236, 240, 222

[56] References Cited

U.S. PATENT DOCUMENTS 5,522,011  5/1996  Epstein et al. ........................ 704/222
5,680,509  10/1997  Gopalakrishnan et al. ............ 704/240

*Primary Examiner*—Thomas D. Lee
*Assistant Examiner*—Wenpeng Chen

*Attorney, Agent, or Firm*—F. Chau & Associates, LLP

[57] ABSTRACT

A system and method are provided which partition the feature space of a classifier by using hyperplanes to construct a binary decision tree or hierarchical data structure for obtaining the class probabilities for a particular feature vector. One objective in the construction of the decision tree is to minimize the average entropy of the empirical class distributions at each successive node or subset, such that the average entropy of the class distributions at the terminal nodes is minimized. First, a linear discriminant vector is computed that maximally separates the classes at any particular node. A threshold is then chosen that can be applied on the value of the projection onto the hyperplane such that all feature vectors that have a projection onto the hyperplane that is less than the threshold are assigned to a child node (say, left child node) and the feature vectors that have a projection greater than or equal to the threshold are assigned to a right child node. The above two steps are then repeated for each child node until the data at a node falls below a predetermined threshold and the node is classified as a terminal node (leaf of the decision tree). After all non-terminal nodes have been processed, the final step is to store a class distribution associated with each terminal node. The class probabilities for a particular feature vector can then be obtained by traversing the decision tree in a top-down fashion until a terminal node is identified which corresponds to the particular feature vector. The information provided by the decision tree is that, in computing the class probabilities for the particular feature vector, only the small number of classes associated with that particular terminal node need be considered. Alternatively, the required class probabilities can be obtained simply by taking the stored distribution of the terminal node associated with the particular feature vector.

16 Claims, 3 Drawing Sheets

SYSTEM AND METHOD FOR PARTITIONING THE FEATURE SPACE OF A CLASSIFIER IN A PATTERN CLASSIFICATION SYSTEM

FIELD OF THE INVENTION

The present invention relates to pattern classification systems. More particularly, the present invention relates to a system and method for partitioning the feature space of a classifier.

BACKGROUND OF THE INVENTION

In pattern classification, which is generally used in pattern recognition and speech recognition systems, one must determine pertinent features or attributes of an object in the scene or a sequence of sounds and extract information about these features. Most features used consist of shape properties, level of pitch, texture, motion, depth, and color. These features are associated or correlated within a processor with classes or identification labels and stored in a processor as a sequence of bits. Each sequence of bits is referred to as a feature vector and it represents information such as the level of pitch of a particular musical note.

In pattern classification it is required to obtain the class probabilities for a particular feature vector to determine information, such as the number of occurrences of a particular feature in the scene and the time and place of each occurrence. For applications such as speech recognition, this is often done by modelling the marginal density of the feature space of a classifier characterizing each class (typically a phone, i.e., a single speech sound) with a model (typically a mixture of gaussians). The class probabilities of the particular feature vector are then computed using the model for each class. However, to model the marginal densities of all the classes to obtain all the class probabilities for a typical large vocabulary speech recognition system which uses tens of thousands of gaussians requires several millions of operations for each feature vector. This computational complexity in obtaining the class probabilities or probability distribution over all the classes for all feature vectors causes a noticeably excessive passage of time, thereby thwarting the real time implementation of speech recognition systems.

A procedure for simplifying the computational complexity of using gaussian models is to construct a hierarchical data structure, based on the acoustic similarity of the gaussian models. Hence a number of the original gaussians are approximated by a single gaussian at the upper levels of the hierarchy, and the approximated models, which are smaller in number than the original number of gaussians, are evaluated first. Subsequently, the original gaussians that correspond to one or more of the approximate models which give the highest probability to the feature vector are evaluated. This technique however causes a degradation in accuracy, due to the crudeness of the approximate models, and further it requires the evaluation of the approximate models.

Accordingly, a need exists for a system and method which constructs a hierarchical data structure and obtains the class probabilities using a minimum amount of computations to enable the implementation of pattern classification systems which operate in real-time.

SUMMARY OF THE INVENTION

In accordance with the subject disclosure, a system and method are provided which partition the feature space of a classifier in a pattern classification system for obtaining the class probabilities for a particular feature vector. The feature vector is a data element comprising of a sequence of bits stored in a memory as electrical signals representing information about a physical pattern. The system and method disclosed herein enable the implementation of pattern classification systems which operate in realtime.

The system and method entail partitioning the feature space of a classifier using hyperplanes and a binary decision tree or hierarchical data structure. The hyperplanes may be linear or non-linear, and each node of the decision tree is characterized by a hyperplane and a threshold value. Given a feature vector, the decision tree is used to identify a subset of the entire feature space that the feature vector lies in. The reason for doing this is because only a small number of the original classes occur in each subset; consequently when evaluating the class probability associated with the feature vector, only a small number of the original set of classes need be considered.

One objective in the construction of the decision tree is to make the class distributions in the subsets as sparse as possible, or in other words, the decision tree is grown to minimize the average entropy of the empirical class distributions at the terminal nodes.

The hierarchical structure or decision tree is first constructed from training data. An illustrative method of constructing the hierarchical structure from the training data, using feature vectors representing corresponding portions of a physical pattern, in accordance with the present invention, includes the following steps: Assigning a class to every training feature vector within a set of training feature vectors. Separating the classes by determining a hyperplane and projecting each of the training feature vectors onto the hyperplane. Assigning the training feature vectors having projections less than a first threshold to a first memory segment and the remaining training feature vectors to a second memory segment. Storing the hyperplane and the first threshold within the first and second memory segments. Separating the classes within the first and/or second memory segments if the classes are associated with a number of training feature vectors greater than a second threshold by repeating above steps. Designating in a memory the first and/or second memory segments as terminal memory segments if the first and/or second memory segments contain classes associated with a number of training feature vectors less than the second threshold. Storing information about the classes associated with the number of training feature vectors less than the second threshold within corresponding terminal memory segments. Recognizing a portion of the physical pattern by retrieving stored information from one or more terminal memory segments corresponding to one or more feature vectors representing that portion.

The step of recognizing a portion of the physical pattern by retrieving stored information relating to one or more feature vectors corresponding to the portion includes the step of identifying the one or more terminal memory segments from where the stored information is to be retrieved from. This step includes the following steps: Projecting the one or more feature vectors onto at least one hyperplane to obtain at least one projection. Comparing the at least one projection with at least one threshold. Choosing a memory segment if the at least one projection is less than the at least one threshold, else choosing another memory segment. Determining whether the chosen memory segment has been designated as a terminal memory segment. These four steps are repeated if the chosen memory segment has not been designated as a terminal memory segment.

The present disclosure also includes a system of pattern recognition using feature vectors representing corresponding portions of a physical pattern. The system includes a first storage unit for storing a plurality of training feature vectors where a class is assigned to each training feature vector. A processor for separating the classes by determining at least one hyperplane and by projecting each of the training feature vectors stored in the first storage unit onto the at least one hyperplane. The processor stores the training feature vectors having projections less than a first threshold to a first memory segment and remaining training feature vectors into a second memory segment. The processor separates the classes within the first and/or second memory segments if the classes correspond to a number of training feature vectors greater than a second threshold. The processor designates the first and/or second memory segments as terminal memory segments if the first and/or second memory segments contain classes corresponding to a number of training feature vectors less than the second threshold. The processor continues to separate and store the classes within memory segments based upon projecting the training feature vectors assigned to classes not stored in a terminal memory segment until all classes are stored within memory segments designated as terminal memory segments. A second storage unit for storing the information within the terminal memory segments and the at least one hyperplane and the first threshold corresponding to every memory segment. The system further includes means for recognizing a portion of the physical pattern by retrieving information which represents the portion of the physical pattern from the second storage unit.

DESCRIPTION OF THE DRAWINGS

An embodiment of the invention will now be described, by way of example, with reference being made to accompanying drawings in which.

DETAILED DESCRIPTION OF THE PREFERRED EMBODIMENTS

One primary function of the system and method according to the present invention is to partition the feature space of a classifier in a pattern classification system using hyperplanes to construct a binary decision tree or hierarchical data structure for obtaining the class probabilities for a particular feature vector. A feature vector is a numeric measurement typically obtained from a speech spectrum. In a digitized measurement system it is a data element having a sequence of bits and stored in a processor as electrical signals which represent information about a physical pattern, such as the pitch of an envelope in the speech spectrum. The system and method disclosed herein is primarily suited for systems which require pattern classification, such as pattern recognition and speech recognition systems. The class probabilities for the particular feature vector are obtained by using a processor to identify a terminal node or a subspace that the particular feature vector lies in, and to retrieve the distribution stored within the processor's memory.

Figure 1:
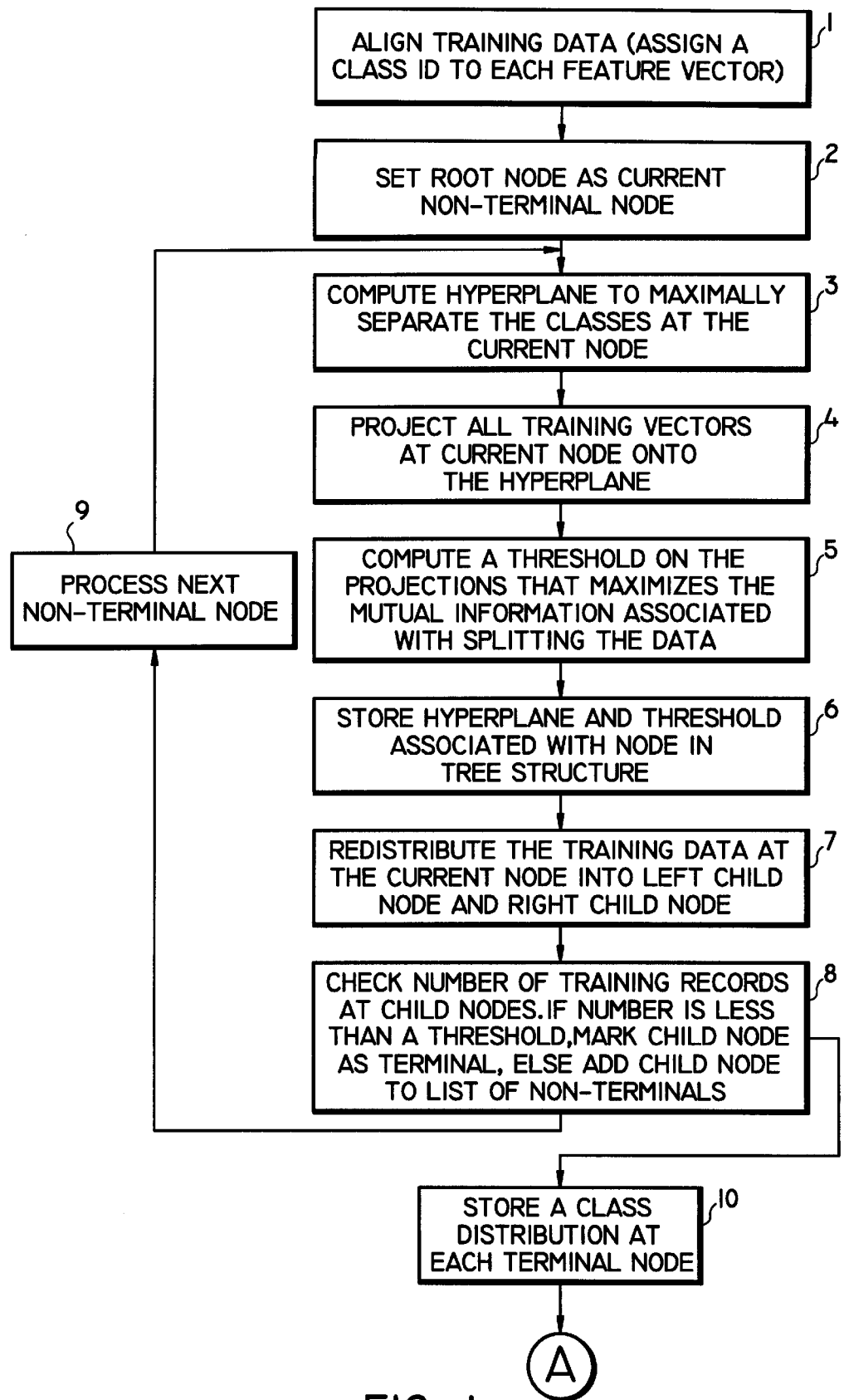
FIG. 1 is a flow chart showing the steps involved for partitioning the feature space of a classifier in a pattern classification system using hyperplanes and a binary decision tree.
Figure 2:
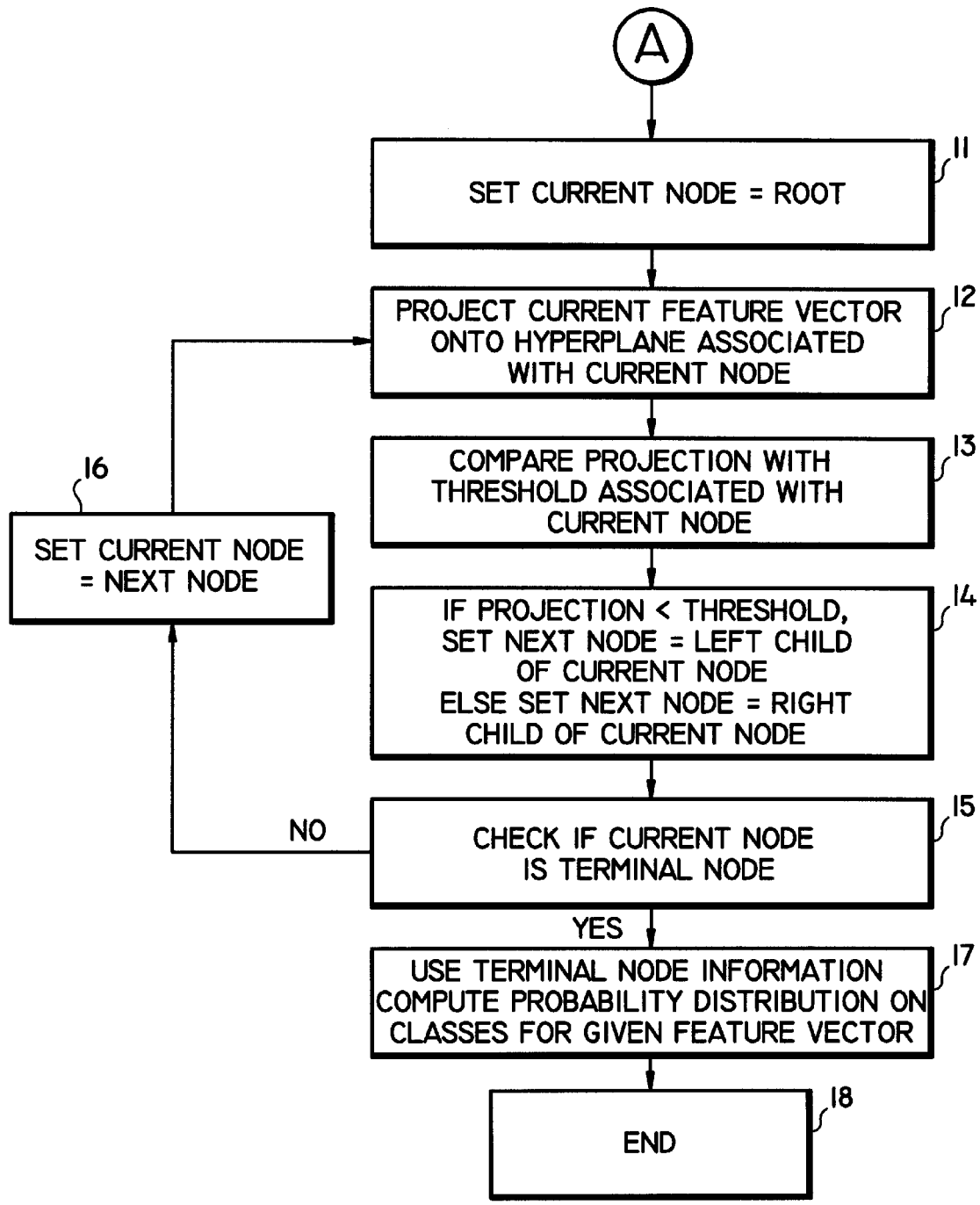
FIG. 2 is a flow chart showing the steps involved for traversing the decision tree and identifying a terminal node for obtaining the class probabilities for a particular feature vector.

The process of constructing the decision tree and using terminal node information to compute class probabilities is depicted by FIGS. 1 and 2. The manner of constructing the decision tree requires a large amount of labelled training data, i.e., a sequence of feature vectors and the class that they are assigned to (in speech recognition, these could be phones, or context-dependent sub-phonetic units). The process of assigning a class to a feature vector is usually done through some form of dynamic programming. In the context of the present disclosure, it is assumed that such labelled training data is available.

With reference to Block 1, the training data is first aligned using a dynamic programming process. This process essentially assigns a classid, i.e., an identification label, to each feature vector in the training data. The decision tree growing process is started in Block 2, with the root node being marked as the current non-terminal node. Hence at this stage, all of the training data is associated with the current node. For the purpose of illustration, assume that there are 10 training vectors that are assigned to 4 classes at the root node; the training vectors along with their assigned classes are shown in Table I.

TABLE I

| | Feature vector | Classid |
|---|---|---|
| $x_1$ | [0.0, 0.9] | 4 |
| $x_2$ | [0.0, 0.8] | 4 |
| $x_3$ | [0.0, 1.0] | 4 |
| $x_4$ | [0.1, 0.3] | 3 |
| $x_5$ | [0.0, 0.2] | 3 |
| $x_6$ | [0.9, 0.0] | 2 |
| $x_7$ | [0.8, 0.0] | 2 |
| $x_8$ | [0.1, 0.0] | 1 |
| $x_9$ | [0.2, 0.0] | 1 |
| $x_{10}$ | [0.3, 0.0] | 1 |

Blocks 3–8 indicate an iterative process that is applied to each non-terminal node in the tree. The process terminates when all the non-terminal nodes have been processed such that every non-terminal node leads to a terminal node.

In Block 3, a hyperplane is computed to maximally separate the classes at the current node. For purposes of illustration, assume that the hyperplane is linear. Such a linear hyperplane can be computed using linear discriminant analysis. Applying the linear discriminant analysis procedure on the training data of Table I yields the two discriminants shown in Table II (along with their corresponding eigenvalues).

TABLE II

| | Eigenvector | Eigenvalue |
|---|---|---|
| $y_1$ | [−0.5553, .8216] | 94.58 |
| $y_2$ | [0.8216, 0.5701] | 15.29 |

The eigenvector, $y_1$, that corresponds to the largest eigenvalue is the vector that provides the maximum amount of discrimination between the classes, and hence specifies the desired hyperplane.

Next, in Block 4, all the training vectors at the current node are projected onto the hyperplane. This essentially involves taking the inner product of the training vectors in Table I and the first eigenvector of Table II, i.e., $y_1^T x_i$. The result is shown in Table III.

TABLE III

| Feature vector | Projection | Classid |
|---|---|---|
| $x_1$ [0.0, 0.9] | 0.7485 | 4 |
| $x_2$ [0.0, 0.8] | 0.6653 | 4 |
| $x_3$ [0.0, 1.0] | 0.8316 | 4 |
| $x_4$ [0.1, 0.3] | 0.1940 | 3 |
| $x_5$ [0.0, 0.2] | 0.1663 | 3 |
| $x_6$ [0.9, 0.0] | −0.4998 | 2 |
| $x_7$ [0.8, 0.0] | −0.4442 | 2 |
| $x_8$ [0.1, 0.0] | −0.0555 | 1 |
| $x_9$ [0.2, 0.0] | −0.1111 | 1 |
| $x_{10}$ [0.3, 0.0] | −0.1666 | 1 |

It can be seen from Table III that the projection onto the hyperplane takes on values in the range [−0.4998, 0.8316]. More specifically for the different classes, the value of the projection for class 4 is in the range [0.6653, 0.8316], and for class 3 in the range [0.1663, 0.1940], while for class 2, it is in the range [−0.4998, −0.4442], and for class 1 it is in the range [−0.1666, −0.0555].

The above methodology can also be used to design non-linear hyperplanes to partition the feature space, as follows: If the d-dimensional feature vector is denoted $x_t = [x_{t,1}, \ldots, x_{t,d}]$, then an augmented feature vector $z_t = f(x_t)$ is derived whose entries are obtained by non-linear operations on $x_t$; for example, $z_t = [x_{t,1}, \ldots x_{t,d}, x^2_{t,1}, x_{t,1}x_{t,2}, \ldots]$. The linear discriminant is now computed for the augmented feature space to correspond to a non-linear partitioning in the original feature space of $x_t$.

In Block 5, a threshold, t, is computed on the projection, with the objective of partitioning the training data at the current node into two child nodes, based on whether the projection of a training vector on the hyperplane is above or below the threshold, e.g., if the projection of a training vector is less than t, then the vector is assigned to the left child node, otherwise it is assigned to the right child node. The underlying motive for partitioning the data is to reduce the average entropy of the classes at the child nodes. Let $H_c$, $H_l$ and $H_r$ denote the entropy of the class distribution at the current node and the left and right child nodes, and $n_c$, $n_l$, and $n_r$ denote the number of training records at the current node, and the left and right child nodes, respectively, then the re-distribution of the data at the current node leads to a reduction in the average entropy of the class distribution, which is quantified as the mutual information associated with the redistribution:

$$MI_{c,t} = H_c - n_l/n_c \, H_l - n_r/n_c \, H_r \quad (1)$$

The objective is to pick a threshold, t, such that the mutual information associated with the re-partitioning is maximized.

The process of selecting the threshold is as follows: find the maximum and minimum value of the projection of the training vectors at the current node onto the linear discriminant (from Table III these values are −0.4998 and 0.8316). The process then divides this range into N intervals (say N=3). The threshold is set equal to each of these N−1 values (for our example −0.056 and 0.3878), and the reduction in average entropy is computed for the corresponding re-partitioning of the data. The redistribution of the training records for these two threshold values, and the corresponding entropies of the class distributions at the child nodes, along with the mutual information associated with the re-distribution are summarized in Table IV. The mutual information is computed using Equation (1), and the entropy is calculated using the formula:

$$H_c = \sum_{i=1}^{c} p_i \log_2 p_i \quad (2)$$

where $p_i$ denotes the empirical probability of class i, and $$\sum_{i=1}^{c} p_i = 1. \quad (3)$$

For our example, the empirical class distribution at the root node from Table I, is [0.3, 0.2, 0.2, 0.3], and the entropy $H_c$ can be calculated from this distribution to be 1.971 bits.

TABLE IV

| t | Data at left child | Data at right child | $H_l$ | $H_r$ | $n_l$ | $n_r$ | MI |
|---|---|---|---|---|---|---|---|
| −0.056 | $x_6$–$x_{10}$ | $x_1$–$x_5$ | 0.971 | 0.971 | 5 | 5 | 1.0 |
| 0.3878 | $x_4$–$x_{10}$ | $x_1$–$x_3$ | 1.557 | 0 | 7 | 3 | 0.881 |

From Table IV, it can be seen that choosing t=−0.056 provides a mutual information of 1 bit, whereas choosing t=0.3878 provides a smaller mutual information of 0.881 bit. Hence, the threshold is selected to be t=−0.056, and the linear discriminant, $y_1$, and the selected threshold, t, are associated with the current node, and then stored in the structure of the tree as specified in Block 6. Subsequently, as shown in Block 7, the data at the current node is re-partitioned into the left and right child nodes, and the projection of a training vector on the hyperplane is computed. If it is less than t, the vector is assigned to the left child node, but if it is equal or greater than t, the vector is assigned to the right child node (this re-distribution is shown in Table IV).

Finally, in Block 8, the number of training records that fall at the left and right child nodes are compared to a predetermined threshold value, such as 5. If the number of records is less than the threshold, then the child node is declared to be a terminal node, and the data at that node is not repartitioned further. If the number of training records at the child node is larger than the threshold, than the child node is marked as a non-terminal node, and added to the list of non-terminal nodes. The procedure (Blocks 3–8) is then repeated for the next non-terminal node in the list of non-terminal nodes (Block 9).

Once the decision tree has been constructed, the empirical distribution of classes at all terminal nodes is obtained from the training data, and stored in the tree structure (Block 10). Alternatively, instead of the empirical distribution, a class distribution can be estimated for each terminal node that optimally models the empirical distribution, and these estimated class distributions can be stored in the tree structure.

The procedure shown by the flow chart of FIG. 1 describes the manner in which the decision tree is constructed. The next step is to use it in evaluating the class probabilities for a particular feature vector. As mentioned earlier, the object of the decision tree was to identify a subspace of the complete feature space that the particular feature vector belongs to. This entails traversing the decision tree from the root node to a terminal node (top-down fashion). The information at the terminal node can then be used to obtain the required class probabilities for the feature vector. FIG. 2 illustrates the procedure involved in traversing the decision tree and identifying a terminal node for every feature vector.

The process of traversing the decision tree for each feature vector is outlined in Blocks 11–16 of FIG. 2. The process starts by setting the current node of the tree to be the root node. The feature vector is then projected onto the hyperplane associated with the current node of the decision tree (Block 12). Subsequently, this projection is compared with the threshold value associated with the current node of the decision tree (Block 13). If the projection is less than the threshold, the left child node of the current node is selected as the next node, or else the right child node is selected as the next node (Block 14). Next, the process checks to see if the next node is a terminal node of the decision tree (Block 15). If it is a terminal node, the objective has been achieved and the leaf associated with the particular feature vector has been found, and the process goes on to compute the class probabilities using the information at the terminal node (Block 17). If the next node is not a terminal node, then the process from Blocks 12–16 is repeated for the next node.

The process of obtaining a class distribution using the information within the terminal node associated with the feature vector is as follows (Block 17). One possibility is to simply use the class distribution stored in the terminal node as the desired probability distribution. An alternative is to use the stored class distribution to narrow down the space of classes that are relevant for the particular feature vector. Hence, the original models of the classifier would still be used to obtain the class distributions, but only those classes that have a non-zero probability in the stored class distribution at the terminal node would be evaluated. The partitioning method then ends (Block 18).

Figure 3:
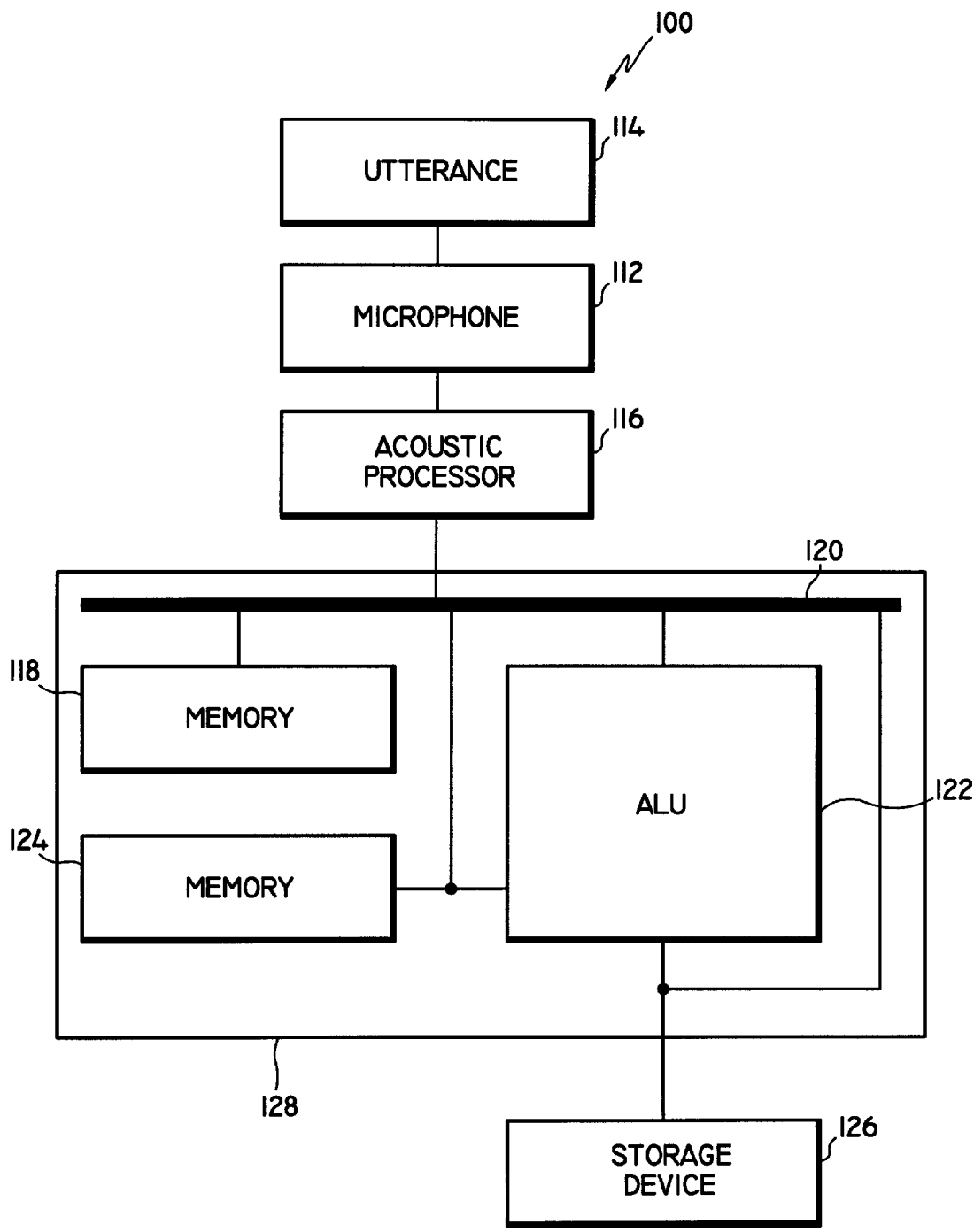
FIG. 3 is a block diagram illustrating an automatic speech recognition system which utilizes the process according to the present invention.

FIG. 3 is a block diagram of an automatic speech recognition system which utilizes the process according to the present invention. The system 100 in FIG. 3 includes a microphone 112 for converting an utterance 114 into an electrical signal. The signal is processed by an acoustic processor 116, e.g. a digitizer, and a sequence of bits representing a plurality of feature vectors is routed and stored in the memory 118 via bus 120. The digitized data is then transmitted to a group of registers within an algorithmic logic unit (ALU) 122 via bus 120 which performs pre-programmed tasks on the data to grow the binary decision tree. After the decision tree is grown, still under the control of source code, the ALU 122 computes a distribution on class values for every node of the decision tree, and stores it in a memory segment within the memory 118, in another storage area 124, or an external storage device 126. The memory 118, the ALU 122, and the storage area 126 reside in a processor 128.

While the invention has been particularly shown and described with reference to the preferred embodiments, it will be understood by those skilled in the art that various modifications in form and detail may be made therein without departing from the scope and spirit of the invention. Accordingly, modifications such as those suggested above, but not limited thereto are to be considered within the scope of the invention.

What is claimed is:

1. A system of pattern recognition using feature vectors representing corresponding portions of a physical pattern, said system comprising:

means for assigning a class to every training feature vector within a set of training feature vectors;

means for nonlinearly mapping the set of feature vectors to a higher dimensional space;

means for separating the classes by computing a projection which maximally separates the classes in the higher dimensional space and projecting each of the training feature vectors;

means for assigning the training feature vectors having projections less than a first threshold to a first memory segment and remaining training feature vectors into a second memory segment;

means for storing the hyperplane and the first threshold within the first and second memory segments;

means for separating the classes within the first and/or second memory segments if the classes are associated with a number of training feature vectors greater than a second threshold;

means for designating in a memory the first and/or second memory segments as terminal memory segments if said first and/or second memory segments contain classes associated with a number of training feature vectors less than the second threshold;

means for storing information about the classes associated with the number of training feature vectors less than the second threshold within corresponding terminal memory segments; and means for recognizing a portion of the physical pattern by retrieving stored information from one or more terminal memory segments corresponding to one or more feature vectors representing said portion.

2. The system as in claim 1, wherein the higher dimensional space is determined by applying linear discriminant analysis on the training feature vectors to determine at least one discriminant vector having a correspondence eigenvalue, where the at least one discriminant vector having the largest eigenvalue provides the maximum amount of separation between the classes and specifies the higher dimensional space.

3. The system as in claim 1, wherein the means for separating the classes obtains an empirical distribution of the classes and calculates the empirical distribution's entropy value, H, using the formula:

$$H = \sum_{i=1}^{c} p_i \log_2 p_i.$$

4. The system as in claim 3, wherein the means for assigning the training feature vectors having projections less than a first threshold to a first memory segment and remaining training feature vectors into a second memory segment comprises:

means for choosing a value for the first threshold which minimizes the average entropy value of the empirical distribution of the classes stored within the first and/or second memory segments.

5. The system of claim 1, wherein the means for recognizing a portion of the physical pattern computes a probability distribution of only the classes stored within the one or more terminal memory segments which their stored class distribution has a non-zero probability.

6. The system of claim 1, wherein the means for recognizing a portion of the physical pattern by retrieving information relating to one or more feature vectors corresponding to said portion comprises:

means for identifying the one or more terminal memory segments from where the stored information is to be retrieved from comprising:

means for projecting the one or more feature vectors onto at least one hyperplane to obtain at least one projection;

means for comparing the at least one projection with at least one threshold;

means for choosing a memory segment if the at least one projection is less than the at least one threshold, else choosing another memory segment;

means for determining whether the chosen memory segment has been designated as a terminal memory segment; and means for repeating the function of the above elements if the chosen memory segment has not been designated as a terminal memory segment.

7. A system of pattern recognition using feature vectors representing corresponding portions of a physical pattern, comprising:

a first storage unit for storing a plurality of training feature vectors where a class is assigned to each training feature vector;

a processor for nonlinearly mapping the training feature vectors to a higher dimensional space, separating the classes by computing at least one hyperplane and by projecting each of the training feature vectors stored in the first storage unit onto the at least one hyperplane, said processor stores the at least one hyperplane and the training feature vectors having projections less than a first threshold to a first memory segment and the at least one hyperplane and the remaining training feature vectors into a second memory segment, said processor separates the classed within the first and/or second memory segments if the classes correspond to a number of training feature vectors greater than a second threshold, said processor designates the first and/or second memory segments as terminal memory segments if the first and/or second memory segments contain classes corresponding to a number of training feature vectors less than the second threshold, said processor continues to separate and store the at least one hyperplane and the classes within memory segments based upon projecting the training feature vectors assigned to classes not stored in a terminal memory segment until all classes are stored within memory segments designated as terminal memory segments;

a second storage unit for storing the information including a probability distribution about the classes which is stored within the terminal memory segments and the at least one hyperplane and the first threshold corresponding to every memory segment; and means for recognizing a portion of the physical pattern by retrieving information which represents said portion of the physical pattern from the second storage unit.

8. The system as in claim 7, wherein the hyperplane is determined by applying linear discriminant analysis on the training feature vectors to determine at least one discriminant vector having a corresponding eigenvalue, where the at least one discriminant vector having the largest eigenvalue provides the maximum amount of separation between the classes and specifies the hyperplane.

9. The system of claim 7, wherein the means for recognizing a portion of the physical pattern computes a probability distribution of only the classes stored within the one or more terminal memory segments which in a class distribution have a non-zero probability.

10. The system of claim 7, wherein the means for recognizing a portion of the physical pattern by retrieving information which represents said portion of the physical pattern from the second storage unit comprises:

means for identifying the one or more terminal memory segments from where the stored information is to be retrieved from comprising:

means for projecting the one or more feature vectors onto at least one hyperplane to obtain at least one projection;

means for comparing the at least one projection with at least one threshold;

means for choosing a memory segment if the at least one projection is less than the at least one threshold, else choosing another memory segment;

means for determining whether the chosen memory segment has been designated as a terminal memory segment; and means for repeating the function of the above elements if the chosen memory segment has not been designated as a terminal memory segment.

11. A method of pattern recognition by building a decision tree to partition feature vector of a classifier, said method comprising of the steps of:

a. assigning a class to each training feature vector within a set of training feature vectors;

b. nonlinearly mapping the set of feature vectors to a higher dimensional space;

c. determining a projection operation that maximally separates the classes in the higher dimensional space, according to a defined measure of separation;

d. applying the projection on the training feature vectors, and selecting a threshold on the projection;

e. partitioning the training feature vectors based on whether the respective projection is less than the threshold; and f. repeating steps (b–e) for each partition with the nonlinear mapping and projection operation based on the training feature vector in the partition.

12. The method of claim 11, wherein the defined measure is the ratio of total covariance to between class covariance, where the covariance matrices are computed on a subset of training feature vector at a current node of the decision tree.

13. The method of claim 11, wherein the step of selecting the threshold includes: i) dividing range of values of the projected feature vectors into a fixed number of intervals and for each value of the interval, partitioning the training feature vectors based on whether the projection of a training feature vector is greater than or less than the interval; and ii) evaluating each partitioning by measuring the reduction in entropy of a class distribution after partitioning.

14. The method of claim 11, wherein the step of selecting the threshold is by finding the mean value of the projections of the feature vectors.

15. The method of claim 11, wherein a probability distribution over the set of classes is estimated for each node of the decision tree including non-terminal nodes.

16. The method of claim 11 wherein for a new feature vector, the decision tree is traversed and a distribution over the classes for the new feature vector is obtained as a linear combination of the distributions at all intermediate nodes that are visited in the process of traversing the decision tree.

* * * * *